(12) United States Patent
Morii

(10) Patent No.: US 6,337,729 B1
(45) Date of Patent: Jan. 8, 2002

(54) LIQUID CRYSTAL DISPLAY DEVICE WITH ELECTRICALLY DISCHARGED SPACERS

(75) Inventor: Yasuhiro Morii, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/220,058

(22) Filed: Dec. 23, 1998

(30) Foreign Application Priority Data

Dec. 25, 1997 (JP) .............................................. 9-356799

(51) Int. Cl.⁷ .......................................... G02F 1/1339
(52) U.S. Cl. ...................................................... 349/155
(58) Field of Search ................ 349/155, 157, 349/141

(56) References Cited

U.S. PATENT DOCUMENTS

| | | | | |
|---|---|---|---|---|
| 5,838,413 A | * | 11/1998 | Matoba et al. | 349/155 |
| 5,946,057 A | * | 8/1999 | Kusanagi | 349/40 |
| 6,124,916 A | * | 9/2000 | Kaneko et al. | 349/141 |

FOREIGN PATENT DOCUMENTS

JP    09-160051    6/1997

* cited by examiner

Primary Examiner—James A. Dudek
Assistant Examiner—Andrew Schechter
(74) Attorney, Agent, or Firm—McDermott, Will & Emery

(57) ABSTRACT

A liquid crystal display device having high contrast ratio and high display quality which does not give any impression of roughness on display plane is provided. An amount of charges on the surface of spacers is made zero or almost zero, whereby brightness of a region where spacers are arranged is adjusted to be at most twice the brightness of that region where the spacers are not arranged in a black (dark) display state, with the spacers distribution density being 100 to 600 particles/mm² and the spacers diameter being 2 to 6 μm. For this purpose, as the spacers for keeping constant a space between an electrode substrate and a counter substrate, those formed by an acrylate resin with its surface plated with gold and having surface specific resistance of 5 Ω·m and diameter of 6 μm are used. Further, the spacers may be distributed by using a spacer distributing apparatus having a spacer carrier pipe system formed of the same material as the surface material of the spacers.

14 Claims, 3 Drawing Sheets

LIQUID CRYSTAL DISPLAY DEVICE WITH ELECTRICALLY DISCHARGED SPACERS

BACKGROUND OF THE INVENTION

1. Field of the Invention

The present invention relates to an in-plane switching type liquid crystal display device and manufacturing method thereof. More specifically, the present invention relates to material of a spacers for keeping a space between panels and a method of distributing the spacers.

2. Description of the Background Art

A liquid crystal display device which advantageously has the feature of thin form, light weight, low power consumption and so on has been widely used as a display device for a watch, a pocket calculator and the like. Especially, a TN (twisted nematic) type liquid crystal display device of which active driving is implemented by a thin film transistor (TFT) or the like has been increasingly popular in the field of display devices for word processors, personal computers and the like for which CRT (cathode lay tube) has been conventionally used. The TN type liquid crystal display device, however, generally has a narrow angle of visibility, and when viewed obliquely, contrast decreases and gradation is inverted. In order to solve this problem, an in-plane switching type liquid crystal display device has been proposed.

The principle of operation of the in-plane switching type liquid crystal display device will be described in the following with reference to FIGS. 3A and 3B. FIGS. 3A and 3B are schematic illustrations showing the state of orientation of liquid crystals in a common in-plane switching type liquid crystal display device. In the figures, interdigital electrode 1a and 1b represent a plurality of electrodes arranged parallel to each other on the same substrate. Interdigital electrode 1a and 1b are formed on electrode substrate 3. Between a counter substrate 4 and electrode substrate 3, liquid crystal molecules 2 are arranged with an orientation film (not shown) interposed. An equipotential line 5 of an electric field is generated by a voltage applied between interdigital electrode 1a and 1b. A pair of polarization plates 7, 8 have transmission axes in the directions of the arrows. FIG. 3A shows the state of orientation of liquid crystal molecules 2 when no voltage is applied between the pair of interdigital electrode 1a and 1b, and FIG. 3B shows the state of orientation when a voltage is applied between the interdigital electrode 1a and 1b. When the voltage is not applied, liquid crystal molecules 2 are oriented in the direction 10 shown in FIG. 3A. At this time, when the polarization plate 7 is arranged with the transmission axis thereof aligned with the direction of orientation 10 and polarization plate 8 is arranged orthogonal thereto, an incident light beam 6 cannot pass through polarization plate 8, and therefore the display is black (dark). When a voltage is applied between interdigital electrode 1a and 1b, an electric field is generated approximately parallel to the substrate surface, and the direction of orientation of liquid crystal molecules 2 changes as shown in FIG. 3B. More specifically, birefringence of the liquid crystal layer changes, so that the incident light beam passes through polarization plate 8 and goes out as outgoing transmission light beam 9, resulting in white (bright) display. In the in-plane switching type liquid crystal display device, the liquid crystal molecules 2 switch approximately parallel to the substrate surface dependent on application/non-application of the voltage. Therefore, even when the viewing direction changes, optical contribution of liquid crystal molecules 2 hardly changes. Therefore, even when viewing angle changes, the contrast ratio and display quality are not degraded. Thus, the device provides excellent viewing angle characteristics.

In an actual in-plane switching type liquid crystal display device, uniaxial orientation disorder occurs near a spacer or spacers used for keeping a space between panels, causing birefringence with respect to the incident light beam, resulting in elliptic polarization. This allows passage of light beam through the other polarization plate 8, which passage of light is viewed as whitening in the black (dark) state. The state of light passage will be described with reference to FIGS. 4A and 4B. In the figure, there is a portion 11 where liquid crystal orientation is in disorder. A conventional spacer 12 is of divinyl benzene, acrylate resin or the like. Charges 13 are held by spacer 12. In the figure, portions coirresponding to those of FIGS. 3A and 3B are denoted by the same reference characters.

The conventional spacer 12 has such a nature that tends to hold charges on its surface during the process of manufacturing a liquid crystal display device. When the conventional spacer 12 is distributed to a surface of either one of electrode substrate 3 or counter substrate 4 on which an orientation film (not shown) is formed, spacer 12 is charged to positive or negative polarity, through contact between spacer 12 and a carrier pipe system of a spacer distributing apparatus. Conventionally, the carrier pipe system of the spacer distributing apparatus is generally formed of a resin based material such as Teflon (trademark) or stainless steel, in view of cost and ease in molding. As spacer 12 is brought into contact with the carrier pipe system formed of a material different from that of spacer 12, polarization occurs near the contact surface, and when the contact surface is separated, charges 13 are generated on the surface of spacer 12. Such a phenomenon is referred to as separation charging. When a liquid crystal material is introduced in this state, liquid crystal molecules 2 in the vicinity of spacer 12 come to be in the state where monoaxial orientation is disordered, as shown in FIG. 4A or 4B, dependent on the state of generation of charges 13 held by spacer 12 or on the characteristics of the liquid crystal material. Here, at the portion 11 where liquid crystal orientation is in disorder, light beam entering from the lower side of the panel is transmitted to the upper side of the panel because of the influence of birefringence of the liquid crystal layer, and viewed as a light passage (whitening). This light passage is particularly noticed which display is in black (dark) state. Contrast ratio, which is one of the display characteristics of the liquid crystal display device, that is, (brightness (transmittance) in the white (blight) state)/(brightness (transmittance) in the black (dark) state) degrades, as brightness (transmittance) in the black state increases. Further, by this light passage, the viewer has an impression that display screen is rough.

In order to provide a liquid crystal display device presenting images of uniform high quality without light passage, Japanese Patent Laying-Open No. 9-160051 proposes a method in which the spacers for defining a space between a pair of electrode substrate are directly fixed on a prescribed positions of the orientation film formed on the electrode substrate, for example on positions of electrode region or on a light shielding film region of the other orientation film. According to this method, the spacers can be distributed and fixed with a narrow pitch and high density only on that orientation film positions which correspond to non-open positions of the liquid crystal display device. Therefore, it is expected that a liquid crystal display device of high quality free of unwanted light leakage, unsatisfactory display or dependency of angle can be obtained. In order to selectively arrange the spacers at prescribed positions, however, it is necessary to add new process steps to the conventional steps of manufacturing. According to the aforementioned Japanese Patent Laying-Open No. 9-160051, it is necessary to newly add the step of irradiating a thermosetting material or the orientation film formed of a thermosetting material, having the function of fixing the spacer material when irradiated with light beam or heat, with ultraviolet ray using a mask pattern, and the step of removing unnecessary spacers not fixed on the orientation film. The increase in manufacturing steps is not desired in view of higher panel cost and lower production yield. Therefore, a method of manufacturing a high quality liquid crystal display device in a simple manner at low cost has been desired.

SUMMARY OF THE INVENTION

The present invention was made to solve the above described problems, and its object is to provide a liquid crystal display device having high display quality with high contrast ratio and free of any impression of rough display surface, and to provide the method of manufacturing the same.

The present invention provides an in-plane switching type liquid crystal display device including an electrode substrate having a plurality of electrodes arranged parallel to each other, a counter substrate sandwiching, together with the electrode substrate, liquid crystal with an orientation film interposed, a pair of polarization plates arranged on outer surfaces of the electrode substrate and the counter substrate with respective transmission axes orthogonally crossing with each other, and spacers for keeping constant a space between the electrode substrate and the counter substrate in which a voltage is applied between the plurality of electrodes to generate an electric field approximately parallel to the substrate surface, causing switch of the liquid crystal molecules approximately parallel to substrate surface, and birefringence of the liquid crystal layer changes, whereby a white (blight) display is given when a voltage is applied to the liquid crystal layer and a black (dark) display is given when a voltage is not applied to the liquid crystal layer, characterized in that amount of charges on the spacer surface is made zero or almost zero, whereby difference in brightness in the black (dark) display state between a region where the spacers are arranged and another region where the spacers are not arranged is adjusted to be within a prescribed range.

Assuming that the spacers each have the diameter of 2 to 6 $\mu$m and spacer distribution density is 100 to 600 particles/mm$^2$, in the black (dark) display state, brightness in a region where the spacers are arranged is at most twice the brightness of the region where the spacers are not arranged.

The spacer has at least its surface formed of a conductive material.

Further, specific resistance of the surface of the spacer is at most 10 $\Omega \cdot$m.

According to the present invention, the method of manufacturing the liquid crystal display device, which has liquid crystal arranged between an electrode substrate having a plurality of electrodes arranged parallel to each other and a counter substrate with an orientation film interposed, and spacers provided for keeping constant a space between the electrode substrate and the counter substrate, includes the step of distributing the spacers to either one of the electrode substrate and the counter substrate on which the orientation film is formed by using a spacer distributing apparatus having a spacer carrier pipe system formed of the same material as the material of the spacer surface.

Further, the present invention provides a method of manufacturing a liquid crystal display device having liquid crystal arranged between an electrode substrate having a plurality of electrodes arranged parallel to each other and a counter substrate with an orientation film interposed, and spacers provided for keeping constant a space between the electrode substrate and the counter substrate, including the steps of supplying ions of which polarity is opposite to that of charges held by the spacers, to the spacers in the carrier pipe system of the spacer distributing apparatus or to the spacer emitted from the distributing apparatus so as to neutralize the charges on the spacer surface, while distributing the spacer to either one of the electrode substrate or the counter substrate on which the orientation film is formed.

Further, the present invention provides a method of manufacturing a liquid crystal display device having liquid crystal arranged between an electrode substrate having a plurality of electrodes arranged parallel to each other and a counter substrate with an orientation film interposed, and spacers provided for keeping constant a space between the electrode substrate and the counter substrate, including the step of, after the spacers are distributed to either one of the electrode substrate and counter substrate on which the orientation film is formed, supplying ions of which polarity is opposite to that of the charges held by the spacers to the substrate, for neutralizing the charges on the spacer surface.

The ions for neutralizing the charges on the spacer surface may be supplied by blowing air containing ions or by soft X-ray irradiation.

According to the present invention, the amount of charges on the spacer surface can be made zero or almost zero, so that difference in brightness in the black (dark) display state between the region where the spacers are arranged and the region where the spacers are not arranged is adjusted to be within a prescribed range. Therefore, roughness in display is not visually recognized, and thus a liquid crystal display device having high contrast ratio and superior display quality can be obtained.

Further, the device is manufactured through the process including the step of supplying ions of which polarity is opposite to that of the charges on the spacers to the spacers in a carrier pipe system of a spacer distributing apparatus or to the spacers emitted from the distributing apparatus so that the spacers are distributed to the substrate on which the orientation film is formed while the charges on the spacer surface are neutralized. Therefore, it is unnecessary to increase the number of process steps for manufacturing the liquid crystal display device, and therefore it becomes possible to manufacture high quality liquid crystal display device at a low cost with high production yield.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
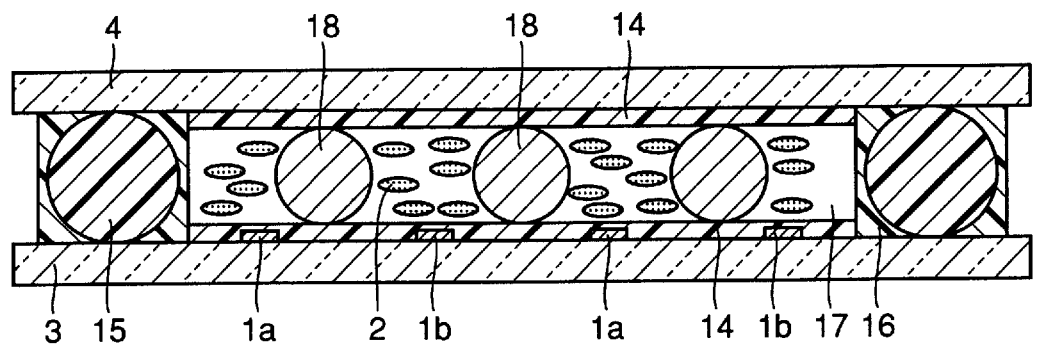
FIG. 1 is a cross sectional view of an in-plane switching type liquid crystal display device in accordance with a first embodiment of the present invention.

Embodiment of the present invention will be described with reference to the figures. FIG. 1 is a cross sectional view showing a structure of an in-plane switching type liquid crystal display device manufactured in accordance with a first embodiment of the present invention. Referring to the figure, interdigital electrode 1a and 1b represent a plurality of electrodes arranged parallel to each other. A liquid crystal layer 17 includes liquid crystal molecules 2. Interdigital electrode 1a and 1b are formed in plurality on an electrode substrate 3. A counter substrate 4 and electrode substrate 3 hold liquid crystal layer 17 therebetween, with an orientation film 14 interposed. In a thermosetting epoxytype seal material 16, spacers 15 are mixed. Spacers 18 are for keeping constant a space between electrode substrate 3 and counter substrate 4, which is, in accordance with the present embodiment, formed of an acrylate resin with its surface plated with gold. Spacer 18 has a surface specific resistance of 5 Ω·m and a diameter of 6 μm. As described with reference to the prior art, the in-plane switching type liquid crystal display device has a pair of polarization plates arranged on outer surfaces of electrode substrate 3 and counter substrate 4 with transmission axes orthgonally crossing with each other, a voltage is applied between interdigital electrode 1a and 1b to generate an electric field approximately parallel to the substrate surface, and the liquid crystal molecules 2 switch approximately parallel to the substrate surface so that birefringence of the liquid crystal molecules 2 is changed, whereby white (bright) display state is given when an incident light beam which has transmitted through one polarization plate is also transmitted through the other transmission plate, while a black (dark) display state is given when an incident light beam which has transmitted through one polarization plate is not transmitted through the other transmission plate. In the present embodiment, the amount of charges on the surface of spacer 18 is made zero or almost zero, so that difference in brightness between the region where spacers 18 are arranged and the region where the spacers 18 are not arranged in black (dark) display state is adjusted to be within a prescribed range. Thus a liquid crystal display device free of any roughness of the display is obtained.

The method of manufacturing the liquid crystal display component in accordance with the present embodiment will be described. First, to electrode substrate 3 having a plurality of interdigital electrode 1a and 1b formed thereon and to counter electrode 7, an orientation film solution (manufactured by NIPPON GOSEI GOM, AL1044) is applied by transfer method, sintered at 200° C. for 90 minutes, and an orientation film 14 is formed. Orientation film 14 has a film thickness of 800 Å. Thereafter, the surface of orientation film 14 is subjected to rubbing process in a direction at an angle of 10° with respect to the normal direction of the electric field generated between interdigital electrode 1a and 1b. Thereafter, spacers 18 each having the surface specific resistance of 5 Ω·m and diameter of 6 μm formed of acrylate resin with its surface plated with gold are distributed to electrode substrate 3 to the density of 400 particles/mm². Further, thermosetting epoxy type seal material 16 with spacers 15 mixed to 1 wt % is applied by using a seal dispenser to counter substrate 4. Electrode substrate 3 and counter substrate 4 thus prepared are superposed with orientation directions being set anti parallel to each other, and thereafter the substrates are subjected to thermocompression bonding, whereby a panel is provided. Thereafter, liquid crystal 17 of which anisotropy of dielectric constant is +10 and anisotopy of index refraction is 0.08 is introduced and sealed, whereby an in-plane switching type liquid crystal display device is manufactured. In the present embodiment, spacers 18 are distributed to electrode substrate 3 and seal material 16 is applied to counter substrate 4. Spacers 18 may be distributed to counter substrate 4 and seal material 16 may be applied to electrode substrate 3.

In the present invention, in order to define roughness in display of the liquid crystal display device, an attempt is made to quantify the roughness. As already described with respect to the prior art, the roughness is caused by the light passage through that portion where uniaxial orientation of liquid crystal molecules is disordered near the spacer holding charges. This results in light passage (whitening) in the black (dark) display state, which is recognized as roughness in display. Thus, an in-plane switching type liquid crystal display device using the spacers having charges held on its surface, and an in-plane switching type liquid crystal display device not having such spacers in the display plane are prepared, and difference in brightness in the black (dark) display state of these devices is calculated. The result holds that when the spacer has the diameter of 2 μm and spacer distribution density is 100 particles/mm², the brightness of the region where the spacers are arranged is twice the brightness of the region where the spacers are not arranged. It may be the case that such a difference in brightness is recognized visually as roughness.

The spacer distribution density in the display plane necessary for manufacturing the in-plane switching type liquid crystal display device is 100 to 600 partides/mm². If the spacer distribution density is smaller than 100 particles/mm², the number of spacer particles is too small to set the thickness of the liquid crystal layer uniform at a target value. On the other hand, if the density exceeds 600 particles/mm², there would be much light passing through the spacers themselves (spacers formed of resin cause birefringence), and therefore the spacers themselves cause roughness in display. As the spacer diameter, 2 to 6 μm is appropriate, as it corresponds to the thickness of the liquid crystal layer of the in-plane switching type liquid crystal display device. In view of foregoing, in order to obtain an in-plane switching type liquid crystal display device having high contrast ratio which does not give any impression of roughness on the display plane, it is necessary that the brightness of the region where the spacers are arranged is adjusted to be at most twice the brightness of the region where the spacers are not arranged with the spacer distribution density being 100 to 600 partide/mm² and the spacer diameter being 2 to 6 μm. It has been found that the brightness difference being within this range, roughness in display is not visually recognized.

It has been confirmed that in the in-plane switching type liquid crystal display device manufactured in accordance with the present embodiment, the brightness of the region where spacers 18 are arranged is at most twice the brightness of the region where spacers 18 are not arranged, in the black (dark) display state, so that roughness in display is not visually recognized. Contrast ratio at any portion in the display plane is at least 200, which means excellent display characteristics. As a comparative example, an in-plane switching type liquid crystal display device was manufactured through similar steps using similar materials, except that conventional spacers 12 formed of divinyl benzene, acrylate resin or the like were used. As a result, roughness in display was visually recognized and contrast ratio was at most 50 in the comparative example.

In the present embodiment, the conductive spacers formed of acrylate resin with its surface plated with gold having surface specific resistance of 5 Ω·m has been used. The specific resistance may be at most 10 Ω·m, and similar effect can be obtained by using the spacer formed of acrylate resin with its surface plated with a material such as Ni or Cu, or when fine powder of stainless steel is used.

Second Embodiment

Figure 2:
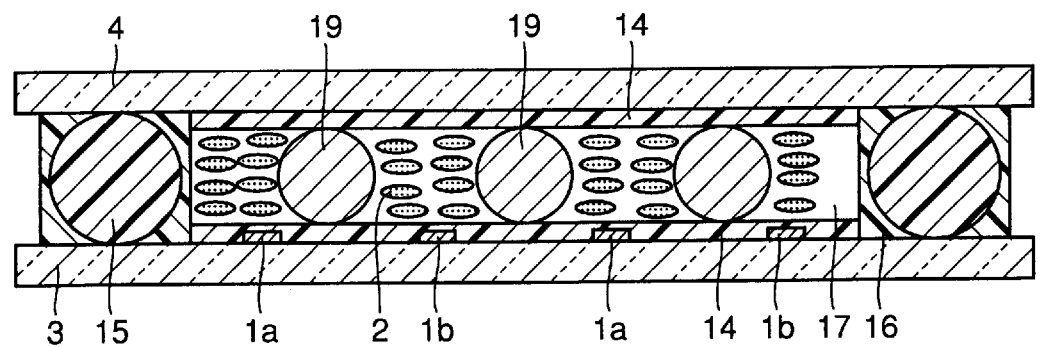
FIG. 2 is a cross sectional view of an in-plane switching type liquid crystal display device in accordance with a second embodiment of the present invention.
Figure 3A:
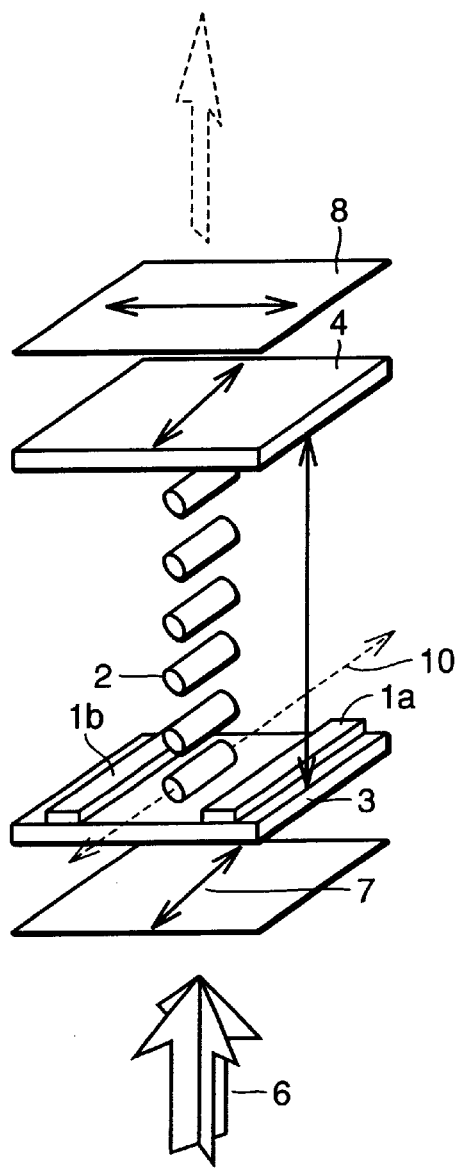
FIGS. 3A and 3B are schematic illustrations showing the principle of operation of the in-plane switching type liquid crystal display device.
Figure 3B:
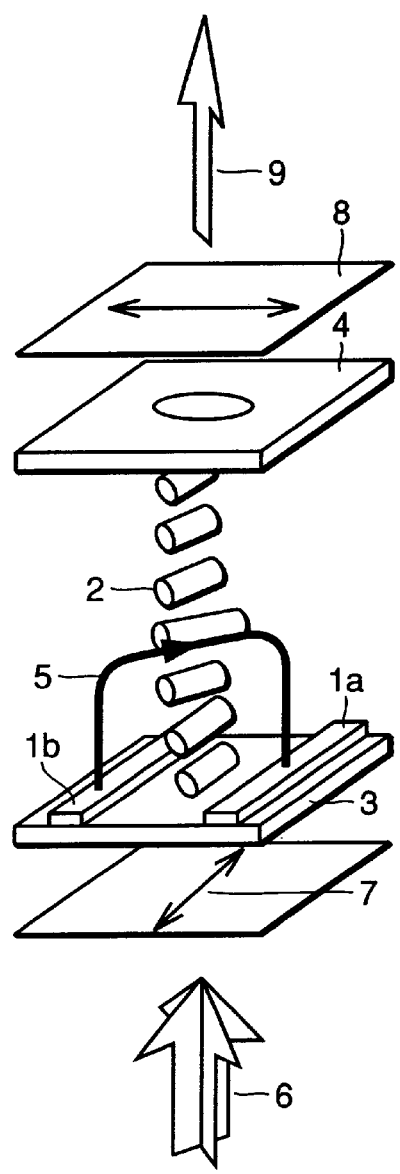
Figure 4A:
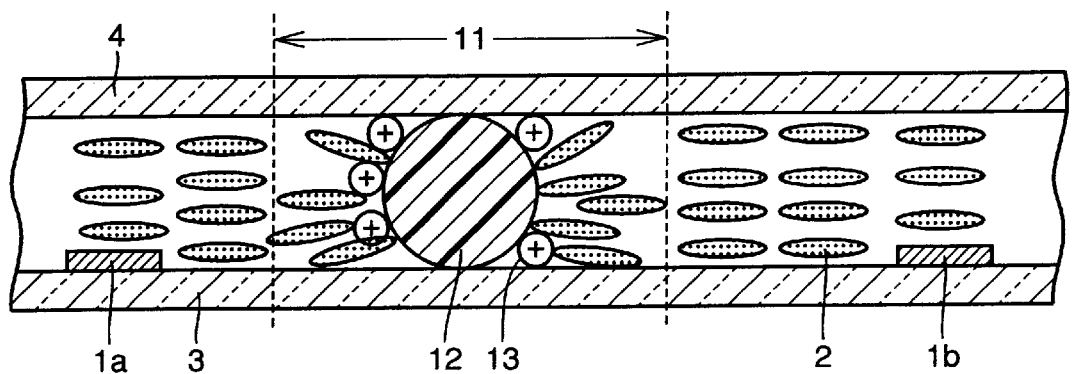
FIGS. 4A and 4B are illustrations related to light passage near the spacer in the conventional in-plane switching type liquid crystal display device.
Figure 4B:
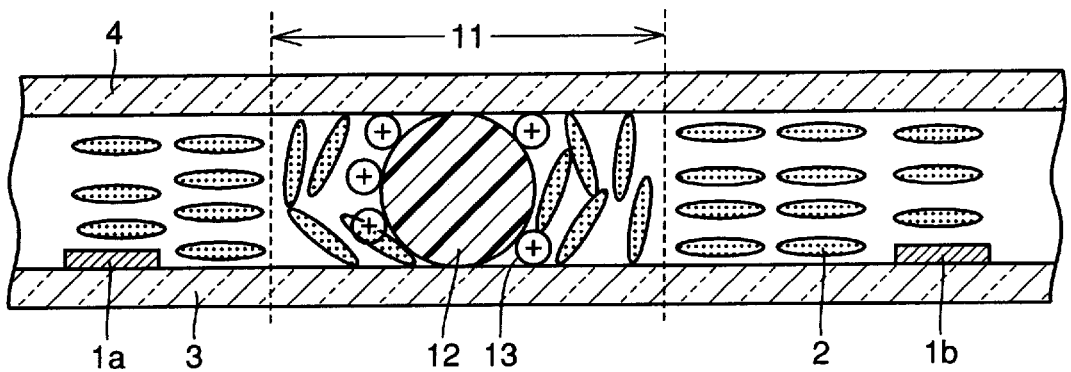

FIG. 2 is a cross sectional view showing a structure of an in-plane switching type liquid crystal display device manufactured in accordance with the second embodiment of the present invention. Referring to figure, spacers 19 are formed of fine powder of stainless steel. A carrier pipe system of a spacer distributing apparatus used for distributing spacers 19 to electrode substrate 3 on which orientation film 14 is formed is also formed of stainless steel. In the figure, portions corresponding to those of FIG. 1 are denoted by the same reference characters.

The steps of manufacturing the in-plane switching type liquid crystal display device in accordance with the present embodiment are similar to those of the first embodiment described above. In the present embodiment, spacers 19 are conductive, and spacers 19 are distributed to electrode substrate 3 on which orientation film 14 is formed, using the spacer distributing apparatus having a spacer carrier pipe system formed of the same material as the surface material of spacers 19. As the surface material of spacers 19 is the same as the material of the carrier pipe system of the distributing apparatus, charges are not generated on spacer 19. When spacers 19 is brought into contact with a different material, charges are generated at the surface. If the carrier path through which spacers 19 are transmitted is formed of a conductor, charges on the surface of spacers 19 are removed in the carrier path, as the spacers are brought into contact with the carrier path. As a result, when distributed to the electrode substrate 3, there is no charge on the surface of spacers 19. At this time, it is necessary that the surface of spacers 19 has the specific resistance of at most 10 Ω·m. If it exceeds 10 Ω·m, charges held by spacers 19 when spacers 19 are brought into contact with the carrier path or carrier pipe system are not sufficiently removed within the carrier pipe system, as the surface resistance is too high.

It has been confirmed that in the in-plane switching type liquid crystal display device manufactured in accordance with the present embodiment, the brightness of the region where spacers 19 are arranged is at most twice the brightness of the region where spacers 19 are not arranged in the black (dark) display state, and the roughness in display is not visually recognized. The contrast ratio is at any position in the display plane at least 200, which means excellent display characteristics.

Third Embodiment

A method of manufacturing an in-plane switching type liquid crystal display device in accordance with a third embodiment of the present invention will be described. According to the present embodiment, a spacers similar to those of the prior art formed of divinyl benzene, acrylate resin or the like are distributed to the electrode substrate on which an orientation film is formed, and thereafter, air containing ions of which polarity is opposite to that of charges held by the spacers, that is, ions of negative polarity, for example, are blown to the substrate (ion blower), whereby the charges on the surface of the spacers are neutralized by the supplied ions. Except this point, the manufacturing process is similar to that of the first embodiment, and therefore, description thereof is not repeated.

Surface potential of the substrate immediately after spacer distribution and surface potential of the substrate after ion blowing manufactured in accordance with the present embodiment were measured. When the distance between the ground and the substrate was set to 1 mm, the former surface potential was 1kV and the latter surface potential was 100V. The neutralizing effect by ion blowing is apparent.

It has been confirmed that in the in-plane switching type liquid crystal display device manufactured in accordance with the present embodiment, the brightness of the region where the spacer is arranged is at most twice the brightness of the region where the spacer is not arranged in black (dark) display state, and that roughness in display is not visually recognized. Further, the contrast ratio is, at any point in the display plane, at least 200, which means excellent display characteristic.

In the present embodiment, ions are supplied to the substrate after the spacer distribution, so as to neutralize charges on the spacer surface. Ions may be supplied to the spacers in the carrier pipe system of the spacer distributing apparatus or to the spacers emitted from the distributing apparatus so that the spacers are distributed to the electrode substrate on which the orientation film is formed while the charges on the spacer surface is neutralized. The ions for neutralizing the charges on the spacer surface may be supplied by soft X-ray irradiation. Further, it is effective to mix ions of which polarity is opposite to the charges held by the spacers in a gas used for distribution.

Structures and effects of the first to third embodiments of the present invention as well as the comparative example are shown in Table 1.

TABLE 1

| | Spacer Material | Discharging Mechanism | Material of Spacer Carrier Pipe System of Distributing Apparatus | Distributed Quantity (Particles/mm²), Spacer Diameter | Effects |
| --- | --- | --- | --- | --- | --- |
| 1st Embodiment | Gold Plated Acrylate Resin (Surface | Not Provided | Different from Spacers | 400, 6 μm | Observed |

TABLE 1-continued

|  | Spacer Material | Discharging Mechanism | Material of Spacer Carrier Pipe System of Distributing Apparatus | Distributed Quantity (Particles/mm²), Spacer Diameter | Effects |
|---|---|---|---|---|---|
| 2nd Embodiment | Stainless Steel (Resistance 10 Ω·m or Smaller) | Not Provided | Same as Spacers | 400, 6 μm | Observed |
| 3rd Embodiment | Acrylate Resin | Provided | Different from Spacers | 400, 6 μm | Observed |
| Comparative Example | Acrylate Resin | Not Provided | Different from Spacers | 400, 6 μm | Not Observed |

The types of liquid crystal materials which can be used in the first to third embodiments described above are not specifically limited. Any liquid crystal material used in the common TN type liquid crystal display device may be used. The value of anisotoropy of dielectric constant of the liquid crystal material is not specifically limited. However, desirable range is 1 to 12. When the anisotoropy of dielectric constant of the liquid crystal material is smaller than 1, response to the electric field is too weak, so that high voltage is necessary for driving. Further, if the value exceeds 12, the liquid crystal material is much polarized, and therefore it tends to include impurity such as ionic impurity, possibly resulting in degradation of the liquid crystal material. The value of anisotoropy of the refractive index and band gap product of the liquid crystal material is not specifically limited. However, the desired value is 0.1 μm to 0.4 μm. Even if the value is smaller than 0.1 μm or larger than 0.41 μm, display is possible. However, there is much coloring, making it difficult to ensure satisfactory color reproductivity.

The types of liquid crystal orientation film which may be used in the first to third embodiments described above are not specifically limited. Soluble polyimid, amic acid firing type polyimid or the like used for a common liquid crystal display device may be used. Though magnitude of pretilt angle is not specifically limited, it should be at most 10°. If the angle exceeds 10°, angle dependency of the angle of visibility is too large, making it difficult to ensure superior characteristic of angle of visibility of the in-plane switching type liquid crystal display device. In the first to third embodiments described above, common substrate material such as glass, quartz or the like used in the conventional liquid crystal display device may be used. Further, a metal film of Al, Cr or the like, a metal oxide film or a multi-layered film including these films may be used as the material of interdigital electrode of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device, comprising:
   an electrode substrate having a plurality of electrodes arranged parallel to each other;
   a counter substrate, together with said electrode substrate, sandwiching a liquid crystal layer including liquid crystal molecules, with an orientation film interposed;
   a pair of polarization plates formed on outer surfaces of said electrode substrate and said counter substrate, respectively, with respective transmission axes arranged orthogonal to each other; and
   a plurality of spacers, each having at least a surface formed of a conductive material arranged between said electrode substrate and said counter substrate to keep constant a space therebetween, no spacer being in contact with any electrode; wherein
   by applying a voltage between said plurality of electrodes to generate an electric field approximately parallel to a surface of said electrode substrate and to cause switch of said liquid crystal molecules approximately parallel to the surface of said electrode substrate, birefringence of said liquid crystal layer is changed, so that a white (bright) display state is given when a voltage is applied to said liquid crystal layer and a black (dark) display state is given when the voltage is not applied to said liquid crystal layer; said device further comprising:
      means for making zero or almost zero an amount of charges on a surface of said spacers so as to enable adjustment of difference in brightness of a region where said spacers are arranged and a region where said spacers are not arranged in the black (dark) display state to be within a prescribed range.

2. The liquid crystal display device according to claim 1, wherein diameter of each of said spacers is at least 2 μm and at most 6 μm.

3. The liquid crystal display device according to claim 1, wherein distribution density of said spacers is at least 100 particles/mm² and at most 600 particles/mm².

4. The liquid crystal display device according to claim 1, wherein brightness of a region where said spacers are arranged is at most twice the brightness of the region where said spacers are not arranged in the black (dark) display state.

5. The liquid crystal display device according to claim 1, wherein diameter of each of said spacers is at least 2 μm and at most 6 μm, distribution density of said spacers is at least 100 particles/mm² and at most 600 particles/mm², and brightness of the region where said spacers are arranged is at most twice the brightness of the region where said spacers are not arranged in the black (dark) display state.

6. The liquid crystal display device according to claim 1, wherein said spacers have a surface of which specific resistance is at most 10 Ω·m.

7. The liquid crystal display device according to claim 1, wherein said spacers are formed of an acrylate resin of which surface is plated with gold.

8. The liquid crystal display device according to claim 1, wherein said spacers are formed of stainless steel powder.

9. A liquid crystal display device, comprising:

an electrode substrate having a plurality of electrodes arranged parallel to each other;

a counter electrode, together with said electrode substrate, sandwiching a liquid crystal layer including liquid crystal molecules, with an orientation film interposed;

a pair of polarization plates arranged on outer surfaces of said electrode substrate and said counter substrate respectively, with respective transmission axes arranged orthogonal to each other; and a plurality of spacers arranged between said electrode substrate and said counter substrate for keeping a constant space therebetween, no spacer being in contact with any electrode, said spacers having at least a surface formed of a conductive material and having a specific resistance of at most 10 $\Omega \cdot$m.

10. A method of manufacturing a liquid crystal display device, comprising the steps of:

forming an orientation film on an electrode substrate having a plurality of electrodes arranged parallel to each other and on a counter substrate; and by using a spacer distributing apparatus having a spacer carrier pipe system formed of the same material as a material of a spacer surface, distributing a plurality of said spacers to either one of said electrode substrate and said counter substrate on which said orientation film is formed.

11. A method of manufacturing a liquid crystal display device, comprising the steps of:

forming an orientation film on an electrode substrate having a plurality of electrodes arranged parallel to each other and on a counter substrate;

distributing a plurality of spacers to either one of said electrode substrate and said counter substrate on which said orientation film is formed; and supplying ions of which polarity is opposite to that of charges held by said spacers to neutralize the charges on a surface of said spacers.

12. The method of manufacturing a liquid crystal display device according to claim 11, wherein said step of distributing said spacers and said step of neutralizing the charges on the surface of said spacers include the step of supplying ions of which polarity is opposite to that of charges held by said spacers to the spacers within a spacer carrier pipe system of a spacer distributing apparatus or to the spacers emitted from said spacer distributing apparatus, for distributing a plurality of said spacers to either one of said electrode substrate and said counter substrate on which said orientation film is formed while the charges on the surface of said spacers are neutralized.

13. The method of manufacturing a liquid crystal display device according to claim 11, wherein said step of neutralizing the charges on the surface of said spacers include the step of supplying, after said spacers are distributed, ions of which polarity is opposite to that of the charges held by said spacers to said substrate.

14. The method of manufacturing a liquid crystal display device according to claim 11, wherein said ions are supplied by blowing air containing said ions or by soft X-ray irradiation.

* * * * *